United States Patent [19]

Degen

[11] 4,229,847

[45] Oct. 28, 1980

[54] UPPER MATTRESSES

[75] Inventor: Hugo Degen, Seltisberg, Switzerland

[73] Assignee: Marpal AG, Chur, Switzerland

[21] Appl. No.: 945,970

[22] Filed: Sep. 26, 1978

[30] Foreign Application Priority Data

Sep. 27, 1977 [CH] Switzerland .................. 11784/77

[51] Int. Cl.$^2$ .................. A47C 27/15; A47C 27/22
[52] U.S. Cl. ........................... 5/481; 5/468;
297/180; 297/DIG. 1
[58] Field of Search .............. 5/481, 480, 468, 461,
5/448, 447, 446, 421; 297/DIG. 1, 453, 180

[56] References Cited

U.S. PATENT DOCUMENTS

| 2,004,106 | 6/1935 | Gaston | 5/461 |
| 2,953,195 | 9/1960 | Turck, Sr. | 5/481 |

FOREIGN PATENT DOCUMENTS

| 151941 | 6/1953 | Australia | 5/481 |
| 1779537 | 12/1971 | Fed. Rep. of Germany | 5/481 |

Primary Examiner—Roy D. Frazier
Assistant Examiner—Alexander Grosz
Attorney, Agent, or Firm—Neil F. Markva

[57] ABSTRACT

An upper mattress for reclining or seating furniture comprises a foam substance member preferably divided horizontally into two symmetrical halves. A plurality of cavities extend through the middle of the member or between the halves transversely to the longitudinal axis of the mattress. Each cavity is defined by a wall having a step forming a horizontal support shoulder extending parallel to the longitudinal axis of the cavity. The shoulder is arranged between the apex of the cavity and the median plane so that the resilient reaction force of the mattress increases continuously with increasing loading and then, when the support shoulder is deflected so as to come into contact with an opposite part of the cavity wall, assumes a progressively increasing value.

11 Claims, 6 Drawing Figures

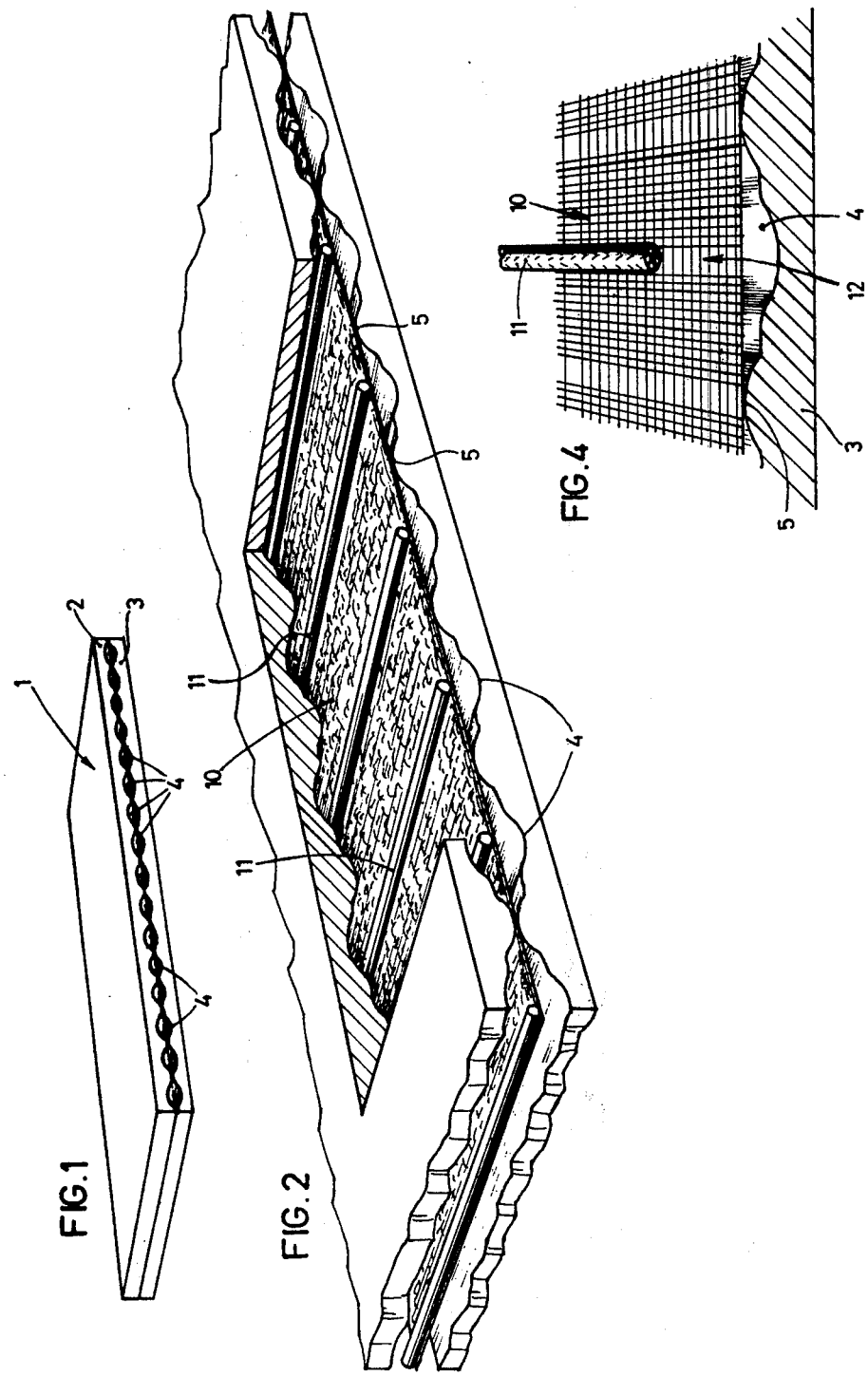

UPPER MATTRESSES

BACKGROUND OF THE INVENTION

The invention relates to an upper mattress for reclining and seating furniture, comprising a foam substance member having a series of continuous cavities which extend transversely to its longitudinal axis.

Sleep is undoubtedly the most valuable source of regeneration and relaxation available to the stressed human being of our time.

In the course of the past decade and a half, critical experts and users have justifiably examined and investigated the suitability of the bed which is to offer the necessary recovery to those who are tired and exhausted. A strict objective scientific approach and subjective criteria of comfort must cooperate in order to combine the numerous factors to be taken into account in the design of reclining furniture into a system capable of offering refreshing sleep.

One of the essential factors of a bed is the upper or top mattress, conventionally briefly described as a mattress and the subject of varied and complex development over recent decades. Its function as a direct support for the resting body is to confer and equalize the resiliently supporting action of the bottom mattress. The expert knows that the material quality of a foam mattress, also expressed in the service life and form stability of the foam substance, increases with an increasing bulk density of the foam substance. The use of foam substances of high quality is however limited in the sense that such foam substances are too hard and could therefore hitherto not be used for the production of top mattresses or only by tolerating an impairment of the resilient characteristics.

Although manufacturers of top mattresses dealt extensively with the problems of selecting materials and of the covering and were able to achieve a wide acceptance of the foam substance top mattress by virtue of its spring characteristics and heat retention characteristics, the problem of variable hardness dependent on loading (spring characteristics) and of automatic ventilation, more particularly while avoiding moist pockets of cold air, remain in principle unsolved.

The prior art discloses foam substance top mattresses assembled from foam substances of different hardness and therefore capable of providing a limited progressiveness of the resilient supporting force (reaction of the foam substance on the load). However, the loading characteristics of these top mattresses are still unsatisfactory when taking into account the locally widely deviating loading applied by the body, which also moves while sleeping. The necessity of constant and effective ventilation as well as discharge of moisture was recognized only in the course of the last few years and is still waiting for a satisfactory solution.

SUMMARY OF THE INVENTION

According to one aspect of the invention, an upper mattress for reclining or seating furniture, comprises a foam substance member having a series of continuous cavities which extend transversely to the longitudinal axis of the member. Cavities are located at its boundary wall with at least one horizontal support shoulder which extends parallel to the longitudinal axis of the cavity. The shoulder is situated in an intermediate region between a horizontal plane of symmetry of the cavity and its top or bottom extremity so that the hardness of the foam substance material situated in the region of each cavity initially rises continuously with an increasing loading. Thereafter, as soon as the support shoulder comes into contact with the corresponding cavity wall portion situated in the same vertical plane, the hardness assumes a progressively increasing value.

A preferred upper or top mattress provides genuine progressiveness of the elastic reaction and provides constant automatic ventilation and discharge of moisture while making use of foam substances of high quality.

The cavities function as ventilating ducts and have a size which can be defined in accordance with requirements. Owing to the size of the cavities, the novel mattress has a constantly available supply of air which absorbs the moisture excreted by the sleeping person and any condensate and which, in a preferred embodiment, transfers it to a hygroscopic fabric and to a wick. Automatic renewal of the air disposed in the ducts is furthermore obtained by the unconscious movements of the sleeper, which movements compress the ventilating ducts and therefore expel air. Due to the resilient restoration effect of the foam substance, the ventilating duct resumes its original shape on relaxing and thus again draws in fresh air from the outside. The moisture content of the wick is therefore maintained at a tolerable level.

The volumetric proportion of the ventilating ducts in the mattress construction as described above may be relatively large so that in its entirety the mattress has a lower than proportional weight with a correspondingly high bulk density of the foam and therefore offers a corresponding saving of material. The reclining comfort and the quality (service life) cannot be achieved by a conventional foam substance mattress which has even an approximately comparable overall weight.

The ability of absorbing loads and the progressive and graded resilient reaction to progressive or greatly varying loading can be substantially defined by suitable choice of the contours of the ventilating cavities or ducts. It is therefore possible to utilize high-grade foam substances, i.e. relatively hard foam substances, whose resilient properties can be adapted to each case by suitable shaping of the cavities and arrangement of the support shoulders.

The intended combination of material and form elasticity confers on preferred mattress an exceptional flexibility in terms of adaptation to varying loading conditions and when the top mattress is bent, for example in the case of convertible beds and on the head part.

BRIEF DESCRIPTION OF DRAWINGS

The invention will be further described, by way of example, with reference to the accompanying drawings, in which:

FIG. 1 is a diagrammatic perspective view of a preferred top mattress;

FIG. 2 is a perspective part-sectional view of the top mattress of FIG. 1;

FIGS. 4 and 5 show details of preferred embodiments; and

DETAILED DESCRIPTION

Figure 3:
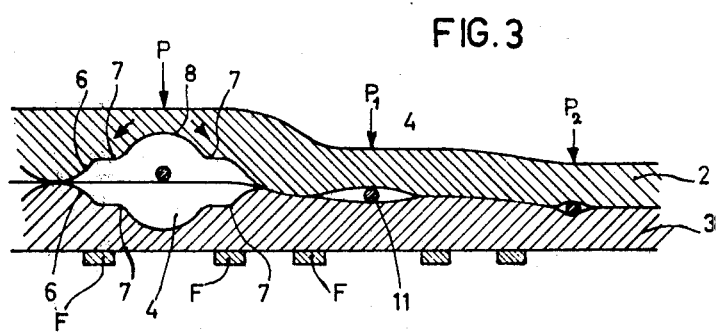
FIG. 3 shows different cases of loadings by means of a vertical sectional view.

The top mattress 1 comprises two foam substance member halves 2 and 3, between which cavities 4 extend transversely to its longitudinal axis. The two foam substance member halves 2 and 3 in the preferred embodiment are of identical shape but it is of course also feasible for two differently-shaped foam substance member halves to be employed or to provide only a single foam substance member with cavities 4.

The two foam substance member halves 2 and 3 are placed one upon the other so that they are in contact with each other at places 5 between adjacent cavities. Proceeding from these contact places 5, the cross-sectional profile of each cavity 4 has a continuously rising or falling curved portion 6 which then merges approximately in the middle region of the cavity half with a support shoulder 7. The support shoulder 7 is adjoined by a further portion 8 of continuous curvature. Advantageously, both cavity halves are constructed with a symmetrical cross-section.

Proceeding from the contact places 5, each cavity profile is initially convex as far as the support shoulder 7 and is concavely curved from there to the oppositely disposed support shoulder 7.

By virtue of this cross-sectional shape, the resilient reaction of the foam substance member halves 2 and 3 to alternating loads which occur is initially associated with a continuously decreasing hardness. When the support shoulder 7 is reached, the hardness increases progressively and thus confers on the mattress spring characteristics which are dependent on load.

The cross-sectional view of FIG. 3 shows three cavities 4 which are subjected, from left to right, to increasing loadings. While the left-hand cavity is completely unloaded and shows the selected cross-sectional profile in its entirety, the two shoulder pairs 7 of the middle cavity bear upon each other under a load $P_1$; at this place the top mattress offers a substantially higher resilient resistance to any further increase in loading. However, here too, a specific form resilience is provided in addition to the natural resilience of the foam substance material to permit further compression of the cavity 4 under a higher load $P_2$.

Figure 5:
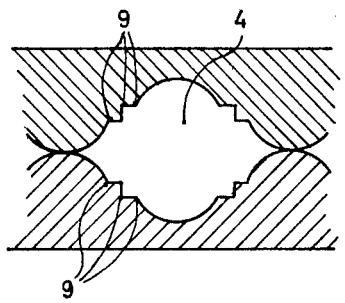

Owing to such grading of the resilient spring characteristics, resulting from matched coordination of material and form elasticity, the body parts of lighter weight (extremities) are supported with a lesser spring hardness while heavier loading, for example in the region of the back, automatically provides progressive adaptation of the hardness. This spring characteristic can be modified as desired by suitable choice of the cross-sectional profile of the cavity. For example, one modified embodiment shown in FIG. 5 reveals three adjacently disposed stepped portions 9 which can come into action progressively with an increasing loading.

A fabric 10, adhesively jointed to the mattress material at the contact places 5, is inserted between the two foam substance member halves 2 and 3 to increase the tensile strength and to improve the buckling characteristics of the top mattress. To obtain better adhesion, the fabric 10 at the places of joining consists advantageously only of warp threads (FIG. 4). Welding or some other form of bonding is also possible.

The cavities 4 have a function in addition to the above-described progressive support function: the air contained in the cavities is saturated with moisture and condensate excreted by the sleeping person and, because of the constant change of cross-section (movements in sleep), discharges such moisture and condensate to the exterior. To reliably avoid any build-up of moisture within the cavities 4, each such cavity has disposed therein additional fabric and/or a moisture-absorbing wick 11. The wick 11 can be attached to the fabric 10 which, to this end, also has only warp threads at the mounting place 12 and thus permits simple fastening of the wick by knotting, sewing etc. When using suitable fabrics, for example serge fabrics, the wick 11 can be incorporated directly into the fabric run. A flat strip of moisture-absorbing material can of course also be used in place of the illustrated wick 11. It would also be possible for the fabric itself to be rendered more moisture-absorbent by means of local reinforcement (multiple folding) at the relevant places, i.e. within the cavities.

The wick 11 absorbs moisture and condensate not only from the ambient air but also by direct contact with the moist cavity walls. According to FIG. 3, the cavity is already compressed under the loads $P_1$ and $P_2$ so that the cavity walls contact the wick 11 over the greater part of its external surface. The wick therefore draws up the moisture like a sponge by capillary action which is assisted by the alternatingly applied force (blotting paper effect).

Figure 6:
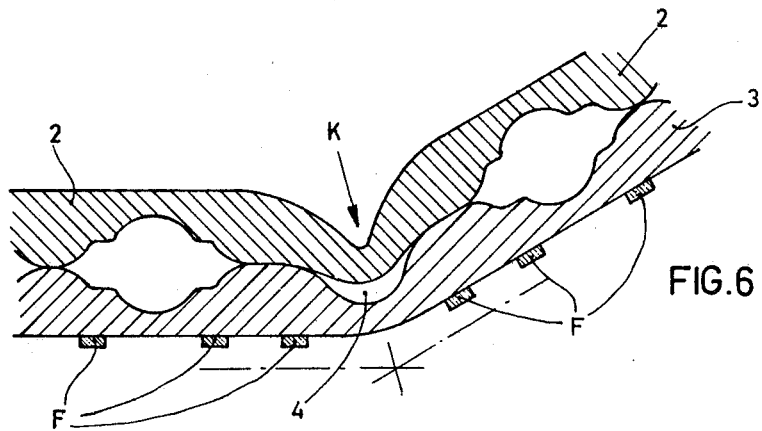
FIG. 6 shows the top mattress in the folding region when it is used in a convertible bed.

It is a third function of the cavities 4 that they represent escape spaces for the adjoining foam substance material and thus prevent sliding of the top mattress, for example in the fold of convertible beds, so that the top mattress is protected in terms of its service life. Folding, which is required in convertible beds, is rendered very difficult in known compact foam substance mattresses and on the one hand leads to severe permanent loading of the material at the place of folding and on the other hand causes undesirable slipping of the top mattress with respect to its base. As shown in FIG. 6, the foam substance can escape into the cavity in the zone of the cavity 4 disposed at the folding place K so that the top mattress can be folded effortlessly, while protecting the material and without the risk of sliding.

Advantageously, the top mattress as described hereinabove can be used on reclining furniture with spring bars disposed transversely to its longitudinal axis. For this reason the spaces between cavities 4 are selected to be identical to the spaces between the spring bars. The top mattress is then placed upon the bottom mattress so that each of the cavities 4 is disposed between two adjacent spring bars. The progressive support action of the shoulders 7 can be improved still further by virtue of the provision of a relatively narrow spring strip F (FIG. 3) beneath each shoulder 7. Since the force P is distributed in the arrow direction and is transmitted to the bottom mattress part via the contact places of the mattress member halves 2,3 it follows that the mattress portion disposed in each cavity is relatively unloaded; the mattress material is therefore not pressed between the two spring strips F with this method of support and is thus protected.

Apart from the method of use as described above it is within the scope of the present invention to employ the top mattress described herein in conjunction with other bottom mattress systems.

Advantageously, the top mattress can be produced by first dividing a block-shaped foam substance member into two halves by means of a cut which extends symmetrically with respect to the horizontal middle plane of the top mattress. These halves are then offset relative to each other so that the protuberances and indentations are situated opposite each other whereupon the protuberances are joined to each other, for example by adhesive joining or welding, after the insertion of the fabric.

I claim:

1. An upper mattress for reclining or seating furniture, said mattress comprising:
   (a) a foam substance member having a longitudinal axis and a plurality of cavities formed therein,
   (b) each cavity defined by a boundary wall and having a longitudinal axis and at least one horizontal support shoulder,
   (c) each cavity further having a horizontal plane of symmetry and an apex with an intermediate region therebetween,
   (d) the longitudinal axes of said cavities extend transversely to the longitudinal axis of said member, and
   (e) each said boundary wall including said at least one horizontal shoulder which extends parallel to said longitudinal axis of said cavity,
   (f) said at least one horizontal shoulder being situated at said intermediate region whereby the resilient reaction force of said foam substance member adjacent each said cavity initially rises continuously with increasing loading and thereafter, as soon as said support shoulder is deflected to contact said boundary wall, assumes a progressively increasing value.

2. A mattress as set forth in claim 1, wherein at least four support shoulders are disposed in vertically displaced pairs symmetrically within each said cavity.

3. A mattress as set forth in claim 1, wherein said foam substance member comprises two identical halves having inward-facing indentations defining therebetween said cavities.

4. A mattress as set forth in claim 3, wherein each said cavity has a cross-sectional profile which is elongate in the horizontal direction and a profile contour which, proceeding from a point of contact between said two halves, is initially convex as far as one of said support shoulders and from there extends concavely to and oppositely disposed one of the support shoulders which is in the same horizontal plane as said first mentioned support shoulder.

5. A mattress as set forth in claim 3, wherein between said two foam substance member halves, there is inserted a fabric to which a moisture-absorbing element is attached within each said cavity.

6. A mattress as set forth in claim 5, wherein each moisture-absorbing element comprises a part of said fabric reinforced by folding.

7. A mattress as set forth in claim 5, wherein each moisture-absorbing element comprises a wick which is anchored to said fabric.

8. A mattress as set forth in claim 5, wherein each moisture-absorbing element is a wick which is anchored to said fabric and wherein said fabric comprises warp and weft threads but has only warp threads at the places of contact between said two foam substance member halves and in the region of the position of said wick.

9. A mattress as set forth in claim 5, wherein each moisture-absorbing element comprises a part of the fabric reinforced by folding and wherein at contact places between said two foam substance member halves said fabric is joined to said foam substance.

10. A mattress comprising:
    (a) a foam substance member having a longitudinal axis and a plurality of cavities formed therein,
    (b) each cavity having a longitudinal axis and being defined by a boundary wall extending between an apex, and a laterally spaced horizontal plane with at least one horizontal support shoulder intermediately located between said apex and said horizontal plane,
    (c) each cavity extending transversely to the longitudinal axis of said foam substance member,
    (d) said at least one horizontal shoulder being effective to cause the resilient reaction force of said foam substance member adjacent each said cavity to initially rise continuously with increasing loading on said mattress.

11. A mattress as set forth in claim 10, wherein the support shoulder is deflectable upon contact with the boundary wall when the mattress is loaded to provide a progressively increasing value of resilient reaction.

* * * * *